United States Patent
Amanai et al.

(10) Patent No.: US 7,692,874 B2
(45) Date of Patent: Apr. 6, 2010

(54) WIDE-ANGLE OPTICAL SYSTEM AND IMAGING APPARATUS USING THE SAME

(75) Inventors: Takahiro Amanai, Shibuya-ku (JP); Akio Michinaka, Shibuya-ku (JP); Hisashi Goto, Shibuya-ku (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/319,956

(22) Filed: Jan. 13, 2009

(65) Prior Publication Data
US 2009/0180200 A1 Jul. 16, 2009

(30) Foreign Application Priority Data
Jan. 15, 2008 (JP) ............................. 2008-005750

(51) Int. Cl.
*G02B 13/18* (2006.01)
*G02B 3/02* (2006.01)
*G02B 9/12* (2006.01)

(52) U.S. Cl. .................. 359/716; 359/708; 359/784

(58) Field of Classification Search ......... 359/708–716, 359/754–758, 763–766, 771–775, 784, 785
See application file for complete search history.

(56) References Cited
U.S. PATENT DOCUMENTS
2009/0046380 A1* 2/2009 Tang ..................... 359/784

FOREIGN PATENT DOCUMENTS
JP 2007-003768 1/2007
JP 2007-047513 2/2007
JP 2007-058153 3/2007

\* cited by examiner

*Primary Examiner*—Darryl J Collins
(74) *Attorney, Agent, or Firm*—Kenyon & Kenyon LLP

(57) ABSTRACT

A wide-angle optical system comprises, in order from its object side, a stop, a first lens (L1) having positive refracting power, a second lens (L2) having negative refracting power and a third lens (L3) that is an aspheric lens. The third lens is configured such that as viewed in a lens section including an optical axis, a portion thereof near the optical axis is in a meniscus shape convex on an object side thereof, and an object side surface and an image side surface thereof at a peripheral site are in a meniscus shape convex on an image side thereof. The optical system satisfies the following conditions (1-1) and (1-2).

$$-0.40 < f/f3 < 0.15 \quad (1\text{-}1)$$

$$0.30 < hc7/hp7 < 2.0 \quad (1\text{-}2)$$

where f is the focal length of the whole wide-angle optical system, and f3 is the focal length of the third lens. When Lm stands for a light ray passing through the center of the stop at an angle of 36° with the optical axis, and Pm7 stands for a point at which Lm passes the image side surface of the third lens, hc7 is supposed to be a distance from Pm7 to the optical axis, and hp7 is supposed to be a distance from a convex apex Pp7 of the image side surface of the third lens to the optical axis.

11 Claims, 11 Drawing Sheets

Example 7

WIDE-ANGLE OPTICAL SYSTEM AND IMAGING APPARATUS USING THE SAME

This application claims benefit of Japanese Application No. 2008-005750 filed in Japan on Jan. 15, 2008, the contents of which are incorporated by this reference.

BACKGROUND OF THE INVENTION

The present invention relates generally to a wide-angle optical system and an imaging apparatus incorporating the same, and more particularly to a wide angle-of-view, small-format optical system capable of relatively close range photography.

With recent slimming-down of cellular phones, personal digital assistants, notebook computers or the like, there are now mounting demands for camera modules having an optical system curtailed to the limit in its optical axis direction length. To meet such demands, there are many single-focus optical systems proposed which are made up of two or three aspheric lenses at most.

In recent years, there have also been imaging devices developed in which even when light is obliquely incident on their peripheral sites, their sensitivity does not drop, and with this, the exit pupil position of an associated optical system can be brought close to an image device side so that the total length of the optical system can be shortened. Among optical systems having a reduced total length so far proposed in the art, there are the ones of Patent Publications 1, 2 and 3 showing that three lenses are used and the exit pupil position is brought close to the imaging device side.

Patent Publication 1: JP(A) 2007-3768
Patent Publication 2: JP(A) 2007-47513
Patent Publication 3: JP(A) 2007-58153

SUMMARY OF THE INVENTION

The present invention provides a wide-angle optical system, characterized by comprising, in order from its object side, a stop, a first lens having positive refracting power, a second lens having negative refracting power and a third lens that is an aspheric lens, wherein said third lens is configured such that as viewed in a lens section including an optical axis, a portion thereof near said optical axis is in a meniscus shape convex on an object side and an object side surface and an image side surface thereof at a peripheral site are in a meniscus shape convex on an image side, with satisfaction of the following conditions (1-1) and (1-2).

$$-0.40 < f/f3 < 0.15 \tag{1-1}$$

$$0.30 < hc7/hp7 < 2.0 \tag{1-2}$$

where f is the focal length of the whole wide-angle optical system, and
f3 is the focal length of said third lens.

Here let Lm stand for a light ray passing through the center of said stop at an angle of 36° with said optical axis, and Pm7 stand for a point at which Lm passes the image side surface of the third lens. Then, hc7 is supposed to be a distance from Pm7 to said optical axis, and hp7 is supposed to be a distance from a convex apex Pp7 of the image side surface of said third lens to said optical axis.

The optical system is also characterized by satisfying the following condition (2).

$$0.06 < dp7/f < 0.3 \tag{2}$$

where dp7 is an optical axis direction length from a point of intersection Pc7 of the image side surface of said third lens with said optical axis to said apex Pp7.

Further, the optical system is characterized in that said second lens satisfies the following condition (3).

$$v2 < 25 \tag{3}$$

where v2 is the Abbe constant of said second lens.

Further, the optical system is characterized in that said first lens and said second lens satisfy the following condition (4).

$$0.9 < R2/R3 < 4.4 \tag{4}$$

where R2 is the radius of curvature of the image side surface of said first lens, and
R3 is the radius of curvature of the object side surface of said second lens.

Yet further, the optical system is characterized by satisfying the following condition (5).

$$0.3 < |Hr/\Sigma d| < 1.4 \tag{5}$$

where Hr is the distance from an imaging plane to a rear principal point position, and
$\Sigma d$ is the total length of the optical system.

Still further, the optical system is characterized by satisfying the following condition (6).

$$-2.0 < Exp/f < -0.45 \tag{6}$$

where f is the focal length of said whole wide-angle optical system, and
Exp is a distance from an image plane position to an exit pupil position.

Still further, the optical system is characterized by satisfying the following condition (7).

$$0.1 < L3d/Fnos < 0.7 \tag{7}$$

where L3d is a distance from the object side surface of said third lens to an imaging position, and
Fnos is a minimum F-number.

Still further, the optical system is characterized by satisfying the following condition (8).

$$25\% < ILL < 45\% \tag{8}$$

where ILL is a proportion of the light quantity at the periphery relative to the light quantity at the center.

Still further, the optical system is characterized by satisfying the following condition (9).

$$0.07 < (R1+R2)/(R1-R2) < 0.8 \tag{9}$$

where R1 is the radius of curvature of the object side surface of said first lens, and
R2 is the radius of curvature of the image side surface of said first lens.

Still further, the optical system is characterized by satisfying the following conditions (10-1) to (10-4).

$$0.39 < fb/f < 0.85 \tag{10-1}$$

$$-1.2 < f2/f < -0.3 \tag{10-2}$$

$$-0.18 < (n1-n3) < 0.08 \tag{10-3}$$

$$1.3 < d4/d5 < 9 \tag{10-4}$$

where fb is the rear focus position of said wide-angle optical system, f2 is the focal length of said second lens, n1 and n2 are the refractive indices of said first lens and said second lens, respectively, d4 is the thickness of said second lens, and d5 is an air spacing between said second lens and said third lens.

The present invention also provides an imaging apparatus, characterized by comprising the aforesaid wide-angle optical system and an imaging device that is located on an image side of said wide-angle optical system and converts an optical image into electric signals.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF EXEMPLARY EMBODIMENTS

Figure 1:
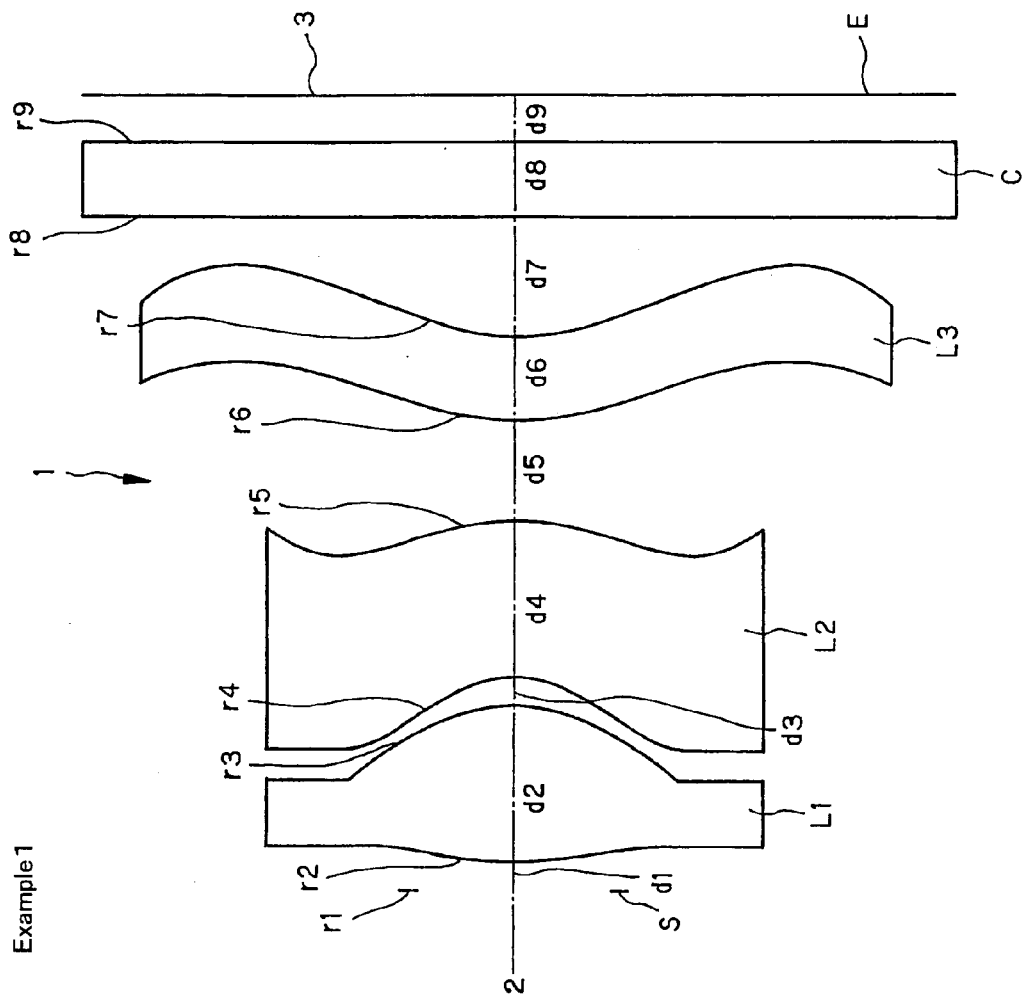
FIG. 1 is illustrative in section of Example 1 of the inventive imaging optical system.

Embodiments of the invention are now explained.

According to one embodiment of the invention, the wide-angle optical system comprises, in order from its object side, a stop, a first lens L1 having positive refracting power, a second lens L2 having negative refracting power and a third lens L3 that is an aspheric surface. And the third lens L3 is configured such that as viewed in a lens section including an optical axis, a portion thereof near the optical axis is in a meniscus shape convex on the object side and an object side surface and an image side surface thereof at a peripheral site are in a meniscus shape convex on an image side. For such arrangement it is preferable to satisfy the following conditions (1-1) and (1-2).

$$-0.40 < f/f3 < 0.15 \quad (1\text{-}1)$$

$$0.30 < hc7/hp7 < 2.0 \quad (1\text{-}2)$$

where f is the focal length of the whole wide-angle optical system, and f3 is the focal length of said third lens. Here let Lm stand for a light ray passing through the center of said stop at an angle of 36° with said optical axis, and Pm7 stand for a point at which Lm passes the image side surface of said third lens. Then, hc7 is supposed to be the distance from Pm7 to said optical axis, and hp7 is supposed to be the distance from the convex apex Pp7 of the image side surface of said third lens to said optical axis.

In the wide-angle optical system according to the embodiment here, the aspheric lens is used for the third lens L3. And as viewed in a lens section including the optical axis, the aspheric surface is configured as follows. A portion of the aspheric surface near the optical axis is configured into a meniscus shape convex on the object side. That is, the object side lens surface and the image side lens surface alike are convex on the object side. Thus, the third lens L3 functions as a meniscus lens near the optical axis.

On the other hand, the peripheral portion is in a meniscus shape convex on the image side. That is, the object side lens surface and the image side lens surface alike are convex on the image side. Thus, the third lens L3 functions as a meniscus lens also at the peripheral portion.

And, in addition to the aforesaid arrangement, the wide-angle optical system according to the embodiment here satisfies condition (1-1). The satisfaction of condition (1-1) enables the total length of the optical system to be sufficiently short relative to the focal length while maintaining the effect on bringing the positions of principal points due to the effect of the second lens having negative refracting power on the object side of the optical system. Because the stop is located nearest to the object side, the exit pupil can be spaced away from the image plane, thereby making small the angle of incidence of light rays on a peripheral portion of an imaging device E. It is consequently possible to get around a drop of sensitivity at the peripheral portion of the imaging device E.

As the optical system is set out in a wide-angle layout, the angle of incidence of off-axis chief rays on the peripheral portion of the imaging device E grows large. Therefore, if condition (1-2) is satisfied, it is then possible to make small the angle of incidence of off-axis chief rays on the peripheral portion of the imaging device E. In turn, it is possible to get around a sensitivity drop of the peripheral portion of the imaging device E, and have an effect on correction of pincushion distortion occurring from the second lens L2 as well.

As the lower limit to condition (1-1) is not reached, it will cause the power at the center of the third lens L3 to grow too large, resulting in the occurrence of some considerable axial chromatic aberrations and, hence, deterioration of imaging capability.

Exceeding the upper limit to condition (1-1) will cause the diverging action at the center of the third lens L3 to become too small, resulting in movement of the principal points toward the image side and, hence, an increase in the size of the optical system.

Running short of the lower limit to condition (1-2) will cause the power at the periphery of the third lens L3 to grow too large, resulting in the occurrence of some considerable chromatic aberration of magnification and, hence, deterioration of imaging capability.

Exceeding the upper limit to condition (1-2) will cause the converging action at the periphery of the third lens L3 to become too small. This will in turn give rise to an increase in the angle of incidence of off-axis chief rays on the peripheral portion of the imaging device E and, hence, a sensitivity drop of the peripheral portion of the imaging device E.

For the wide-angle optical system according to the embodiment here, it is also desirous to satisfy the following condition (2).

$$0.06 < dp7/f < 0.3 \quad (3)$$

where dp7 is a length in the optical axis direction of the point of intersection Pc7 of the image side surface of the third lens L3 with the optical axis to the apex Pp7.

As the optical system is set out in a wide-angle layout, the angle of incidence of off-axis chief rays on the peripheral portion of the imaging device E grows large. Therefore, if condition (2) is satisfied with respect to the aspheric shape of the peripheral portion of the third lens L3, it is then possible to make small the angle of incidence of off-axis chief rays on the peripheral portion of the imaging device E and, hence, to get around a sensitivity drop of the peripheral portion of the imaging device E.

Running short of the lower limit to condition (2) will cause the power at the periphery of the third lens L3 to grow too large, resulting in the occurrence of some considerable chromatic aberration of magnification and, hence, deterioration of imaging capability.

Exceeding the upper limit to condition (2) will cause the converging action at the periphery of the third lens L3 to get too small, resulting in an increase in the angle of incidence of off-axis chief rays on the peripheral portion of the imaging device E and, hence, a sensitivity drop of the peripheral portion of the imaging device E.

Figure 15:
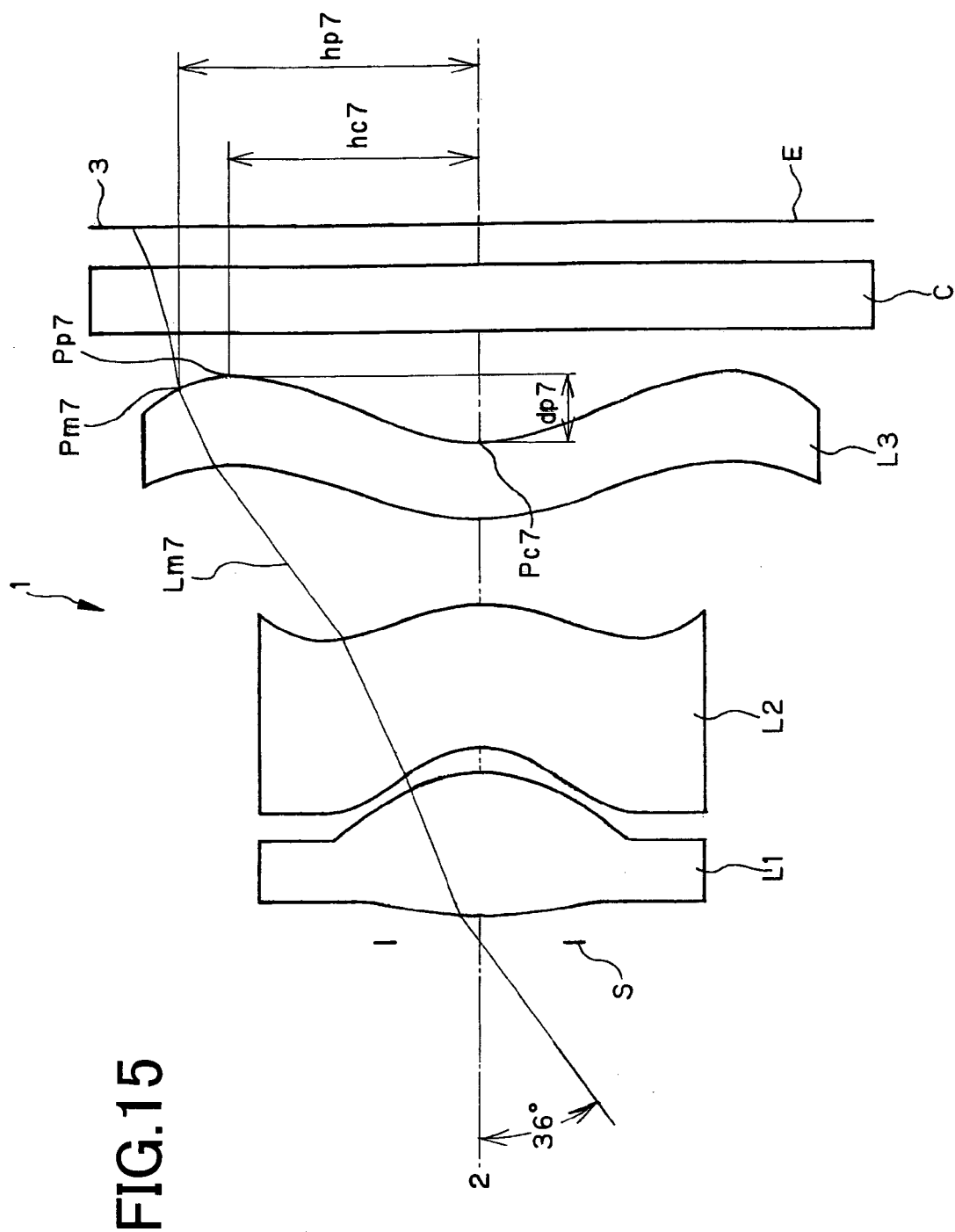
FIG. 15 is illustrative of parameters in conditions (1-1), (1-2) and (2).

Note here that the parameters (Lm, Pm7, hc7, Pp7, hp7 and dp7) in conditions (1-1), (1-2) and (2) are as shown in FIG. 15.

For the second lens L2, it is desirous to satisfy the following condition (3).

$$v2 < 25 \quad (3)$$

where v2 is the Abbe constant of the second lens L2.

To set out the optical system in a wide-angle layout, the first lens L2 must have a short focal length; however, such a short focal length will bring about chromatic aberrations. The third lens L3 is an aspheric lens of the aforesaid shape. In other words, the third lens L3 has a point of inflection on the image side surface. For this reason, if axial chromatic aberrations are corrected at the third lens L3, there is then some considerable chromatic aberration of magnification produced at the peripheral portion. It is thus preferable to use a material of high dispersion for the second lens L2, thereby making correction of chromatic aberration of magnification. Note here that the second lens L2 is preferably given a proper power bringing about no increase in coma.

Exceeding the upper limit to condition (3) will render removal of chromatic aberration of magnification at the second lens L2 insufficient, resulting in drastic deterioration of peripheral performance.

For the first lens L1 and the second lens L2 alike, it is desirous to satisfy the following condition (4).

$$0.9 < R2/R3 < 4.4 \quad (4)$$

where R2 is the radius of curvature of the first lens L1, and R3 is the radius of curvature of the second lens L2.

Condition (4) is provided to make narrow the air spacing between the first lens L1 and the second lens L2 without worsening aberrations. The satisfaction of condition (4) contributes more to the slimming down of the optical system, because the first lens L1 and the second lens L2 can be positioned in close relations.

Running short of the lower limit to condition (4) will give rise to large coma.

Exceeding the upper limit to condition (4) will require larger air spacing, resulting in a lot bulkier size.

Further, it is desirous to satisfy the following condition (5).

$$0.3 < |Hr/\Sigma d| < 1.4 \quad (5)$$

where Hr is the distance from an imaging plane to a rear principal point position, and $\Sigma d$ is the total length of the wide-angle optical system.

By the satisfaction of condition (5), it is possible to keep the total length of the optical system short while holding back the occurrence of field curvature.

Running short of the lower limit to condition (5) will cause the total length to grow long.

Exceeding the upper limit to condition (5) will cause the angle of view of the optical system to grow too large relative to the total length, having much difficulty in correction of field curvature.

Further, it is desirous to satisfy the following condition (6).

$$-2.0 < Exp/f < -0.45 \quad (6)$$

where f is the focal length of the whole wide-angle optical system, and Exp is the distance from an image plane position to an exit pupil position.

The satisfaction of condition (6) ensures a sensible tradeoff between size reductions and sustained peripheral performance.

Running short of the lower limit to condition (6) will need to locate the exit pupil at a far away position, rendering the optical system bulky.

Exceeding the upper limit to condition (6) will cause the angle of incidence of light on the periphery of the imaging device to grow too large, resulting in some considerable deterioration of peripheral performance.

Further, it is desirous to satisfy the following condition (7).

$$0.1 \text{ (mm)} < L3d/Fnos < 0.7 \text{ (mm)} \quad (7)$$

where L3d is the distance from the object side surface of the third lens L3 to the imaging position, and Fnos is the minimum F-number.

Running short of the lower limit to condition (7) will cause the F-number to become small, or it will cause the distance from the object side surface of the third lens L3 to the imaging position to become short, rendering dusts in the optical system noticeable.

Exceeding the upper limit to condition (7) will cause the distance from the object side surface of the third lens L3 to the imaging position to grow long, rendering the optical system too bulky.

Further, it is desirous to satisfy the following condition (8).

$$25\% < ILL < 45\% \quad (8)$$

where ILL is the proportion of the light quantity at the periphery to the light quantity at the center.

The wide-angle optical system of the embodiment here, because of being of the so-called telephoto type, is apt to produce positive distortion. As positive distortion is produced, light quantity at the periphery decreases. To increase the light quantity at the periphery, correction is thus implemented such that the positive distortion turns to negative one. As the imaging device E and a lens barrel shift in the vertical direction to the optical axis, it causes distortion to be produced asymmetrically. Asymmetrically produced distortion renders the light quantity at the periphery asymmetric, rendering image quality drastically worse. The satisfaction of condition (8) prevents asymmetric distortion from occurring, balancing the light quantity at the center well against the light quantity at the periphery.

Running short of the lower limit to condition (8) will cause the light quantity at the periphery to become too small. In this case, much difficulty will be experienced in the adjustment of image brightness by electrical correction.

Exceeding the upper limit to condition (8) will give rise to an increase in the amount of negative distortion produced. In turn, this will cause an increase in the sensitivity of distortion to decentration, which will then be apt to bring about asymmetric distortion. Accordingly, added steps will be necessary for adjustment, leading to production cost increases. Note here that the decentration means misalignments of the imaging device E and lens barrel from the center axis.

Further, it is desirous to satisfy the following condition (9).

$$0.07 < (R1+R2)/(R1-R2) < 0.8 \quad (9)$$

where R1 is the radius of curvature of the object side surface of the first lens L1, and R2 is the radius of curvature of the image side surface of the first lens L1.

In the optical system, the first lens L1 has the shortest focal length, and so it is most vulnerable to assembly errors during production. Therefore, if condition (9) is satisfied, it is then possible to reduce production variations and, hence, achieve good optical performance.

Running short of the lower limit of condition (9) will cause the radius of curvature of R1 to become too small. Accordingly, the tilt of light rays incident on the object side surface of the first lens L1 will grow large relative to the normal to that surface, resulting in an increased sensitivity of the lens to decentration.

Exceeding the upper limit to condition (9) will cause the radius of curvature of R1 to become too small. Accordingly, the tilt of light rays leaving the image side surface of the first lens L1 will grow large relative to the normal to that surface, resulting in an increased sensitivity of the lens to decentration.

Further, it is desirous to satisfy the following condition (10-1) to (10-4).

$$0.39 < fb/f < 0.85 \quad (10\text{-}1)$$

$$-1.2 < f2/f < -0.3 \quad (10\text{-}2)$$

$$-0.18 < (n1-n3) < 0.08 \quad (10\text{-}3)$$

$$1.3 < d4/d5 < 9 \quad (10\text{-}4)$$

where fb is the back focus position of the wide-angle optical system (the first L1, the second L2, and the third lens L3), f2 is the focal length of the second lens L2, n1 and n2 are the refractive indices of the first L1 and the second lens L2, respectively, d4 is the thickness of the second lens L2, and d5 is the air spacing between the second L2 and the third lens L3.

As the lower limit to condition (10-1) is not reached, it will cause the lens nearest to the image side to draw too close to a sensor, and eventually allow dusts or flaws on the lens to be imaged in the sensor, resulting in deterioration of image quality.

The upper limit to condition (10-1) is exceeded, it will cause the distance from the first lens L1 up to the third lens L3 to become too short. In this case, the optical system will have an increasing sensitivity to decentration and will be vulnerable to production errors, resulting in a worsening of imaging capability.

Running short of the lower limit to condition (10-2) will cause the power of the second lens L2 to grow too strong. Consequently, coma will occur tightly, resulting in a worsening of imaging capability.

Exceeding the upper limit to condition (10-2) will undermine the power of the second lens L2. In this case, the principal point positions will shift toward the image side, resulting in an increase in the total length of the optical system.

Running short of the lower limit to condition (10-3) will cause the refractive index of the third lens L3 to grow high. In this case, there will be distortion or field curvature occurring from production errors of surface configuration, resulting in a worsening of imaging capability.

Exceeding the upper limit to condition (10-3) will cause the refractive index of the first lens L1 to grow high. In this case, there will be spherical aberrations or coma occurring from production errors of surface configuration, resulting in a worsening of imaging capability.

Running short of the lower limit to condition (10-4) will cause the refractive index of the third lens L3 to grow high. In this case, there will be distortion or field curvature occurring from production errors of surface configuration, resulting in a worsening of imaging capability.

Exceeding the upper limit to condition (10-4) will cause the refractive index of the first lens L1 to grow high. In this case, there will be spherical aberrations or coma occurring from production errors of surface configuration, resulting in a worsening of imaging capability.

It is here noted that all the lenses are preferably constructed of resin.

It is also preferable that a shutter is located nearest to the object side. In this case, the shutter may serve as, or be separate from, the stop.

It is further preferable that a variable stop is located nearest to the object side.

For the wide-angle optical system according to the embodiment here, it is preferable to replace conditions (1-1) and (1-2) by the following ones.

$$-0.25 < f/f3 < 0.01 \quad (1\text{-}1)$$

$$0.50 < hc7/hp7 < 1.24 \quad (1\text{-}2)$$

For the wide-angle optical system according to the embodiment here, it is also preferable to replace condition (1-1) by the following one.

$$-0.25 < f/f3 < -0.02 \quad (1\text{-}1)$$

The satisfaction of condition (1-1) enables to make a difference between the on-axis and off-axis powers of the third lens L3. In turn, this makes it easy to reduce the size of the optical system and correct distortion.

For the wide-angle optical system according to the embodiment here, it is preferable to replace condition (2) by the following one.

$$0.09 < dp7/f < 0.19 \quad (2)$$

For the wide-angle optical system according to the embodiment here, it is preferable to replace condition (4) by the following one.

$$1.2 < R2/R3 < 2.8 \quad (4)$$

For the wide-angle optical system according to the embodiment here, it is preferable to replace condition (5) by the following one.

$$0.46 < |Hr/\Sigma d| < 0.89 \quad (5)$$

For the wide-angle optical system according to the embodiment here, it is preferable to replace condition (6) by the following one.

$$-1.3 < Exp/f < -0.58 \quad (6)$$

For the wide-angle optical system according to the embodiment here, it is preferable to replace condition (7) by the following one.

$$0.18 < L3d/Fnos < 0.43 \quad (7)$$

For the wide-angle optical system according to the embodiment here, it is preferable to replace condition (8) by the following one.

$$25\% < ILL < 42\% \quad (8)$$

For the wide-angle optical system according to the embodiment here, it is preferable to replace condition (9) by the following one.

$$0.09 < (R1+R2)/(R1-R2) < 0.49 \quad (9)$$

For the wide-angle optical system according to the embodiment here, it is preferable to replace conditions (10-1) to (10-4) by the following ones.

$$0.39 < fb/f < 0.45 \quad (10\text{-}1)$$

$$-1.2 < f2/f < -0.1 \quad (10\text{-}2)$$

$$-0.01 < (n1-n3) < 0.05 \quad (10\text{-}3)$$

$$1.3 < d4/d5 < 4 \quad (10\text{-}4)$$

According to the embodiments as described above, close range photography can be implemented while keeping good imaging capability, and wide area photography can be implemented as well.

Examples 1 to 7 of the imaging optical system are now explained with reference to the accompanying drawings where 1 stands for the wide-angle optical system, 2 the center axis, 3 the image plane, L1 the first lens, L2 the second lens, L3 the third lens, S the aperture stop, C the cover glass, and E the imaging device such as a CCD. Numerical data and the respective conditions in all the examples will be enumerated later. The positive lens and the negative lens are here supposed to have a positive value and a negative value, respectively, for the paraxial focal length.

FIG. 1 is illustrative of the lens arrangement of Example 1 of the inventive imaging optical system.

As shown in FIG. 1, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 2:
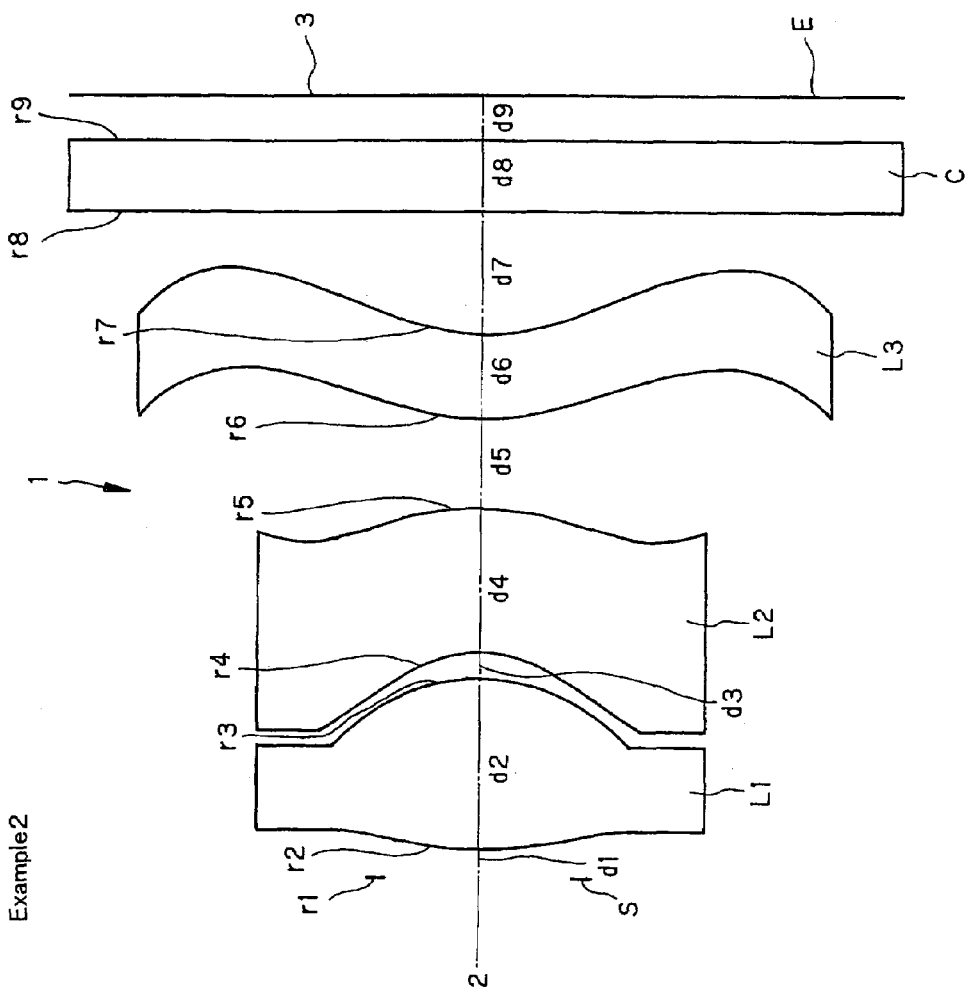
FIG. 2 is illustrative in section of Example 2 of the inventive imaging optical system.

FIG. 2 is illustrative of the lens arrangement of Example 2 of the inventive imaging optical system.

As shown in FIG. 2, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 3:
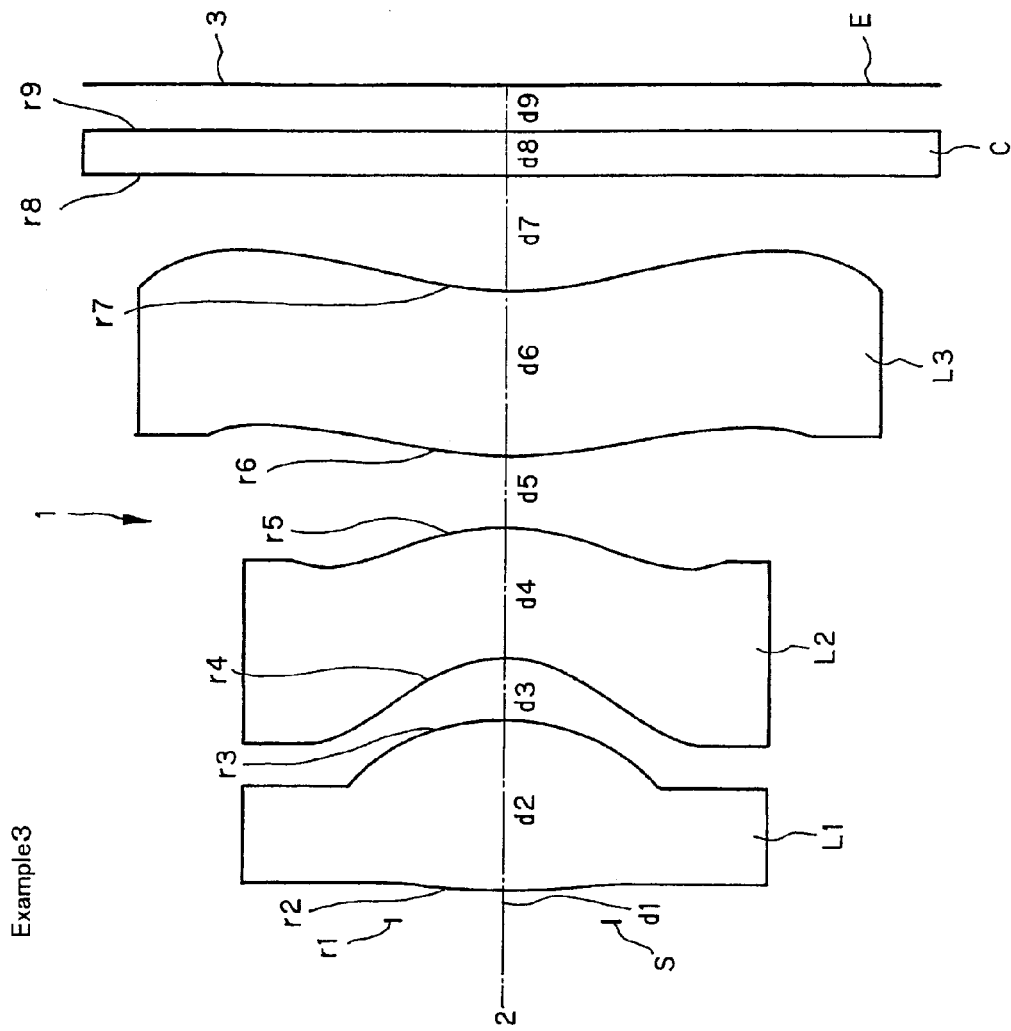
FIG. 3 is illustrative in section of Example 3 of the inventive imaging optical system.

FIG. 3 is illustrative of the lens arrangement of Example 3 of the inventive imaging optical system.

As shown in FIG. 3, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 4:
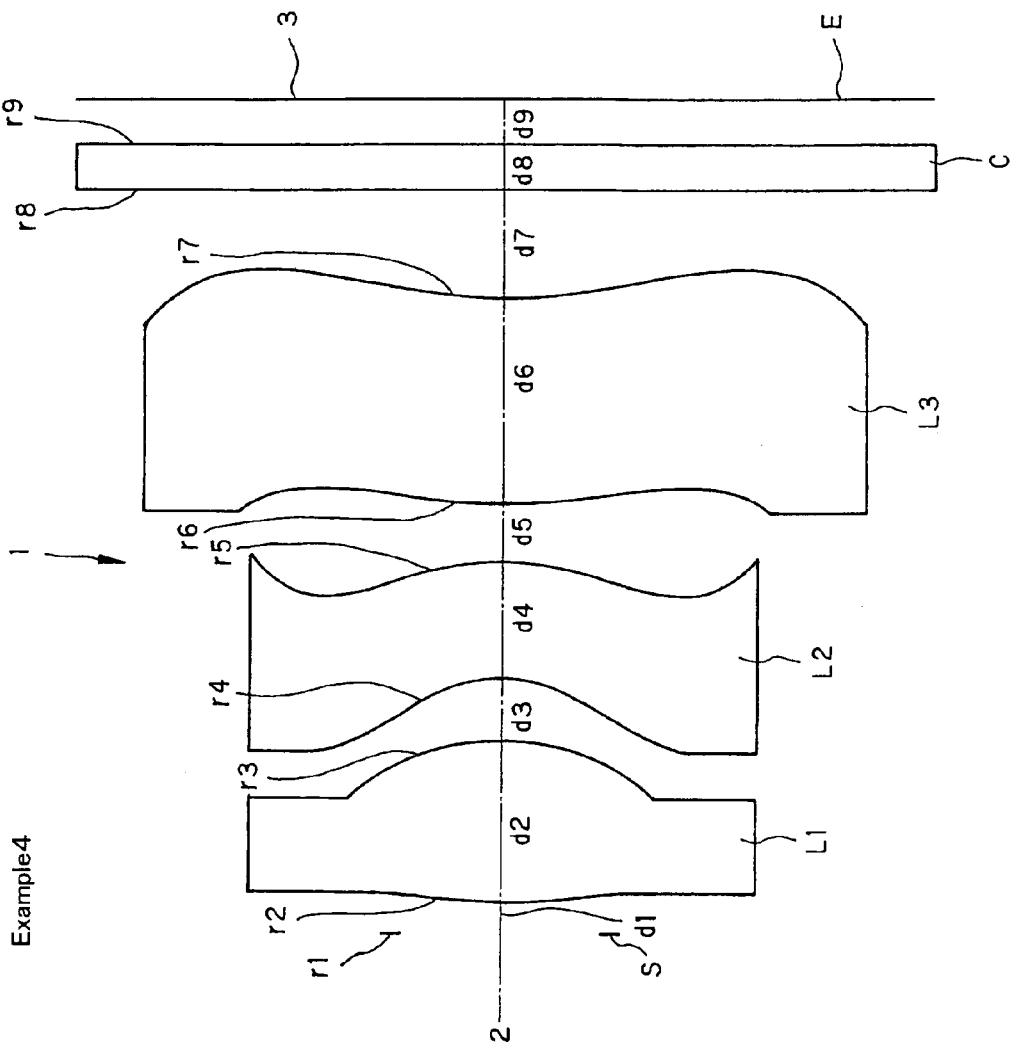
FIG. 4 is illustrative in section of Example 4 of the inventive imaging optical system.

FIG. 4 is illustrative of the lens arrangement of Example 4 of the inventive imaging optical system.

As shown in FIG. 4, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 5:
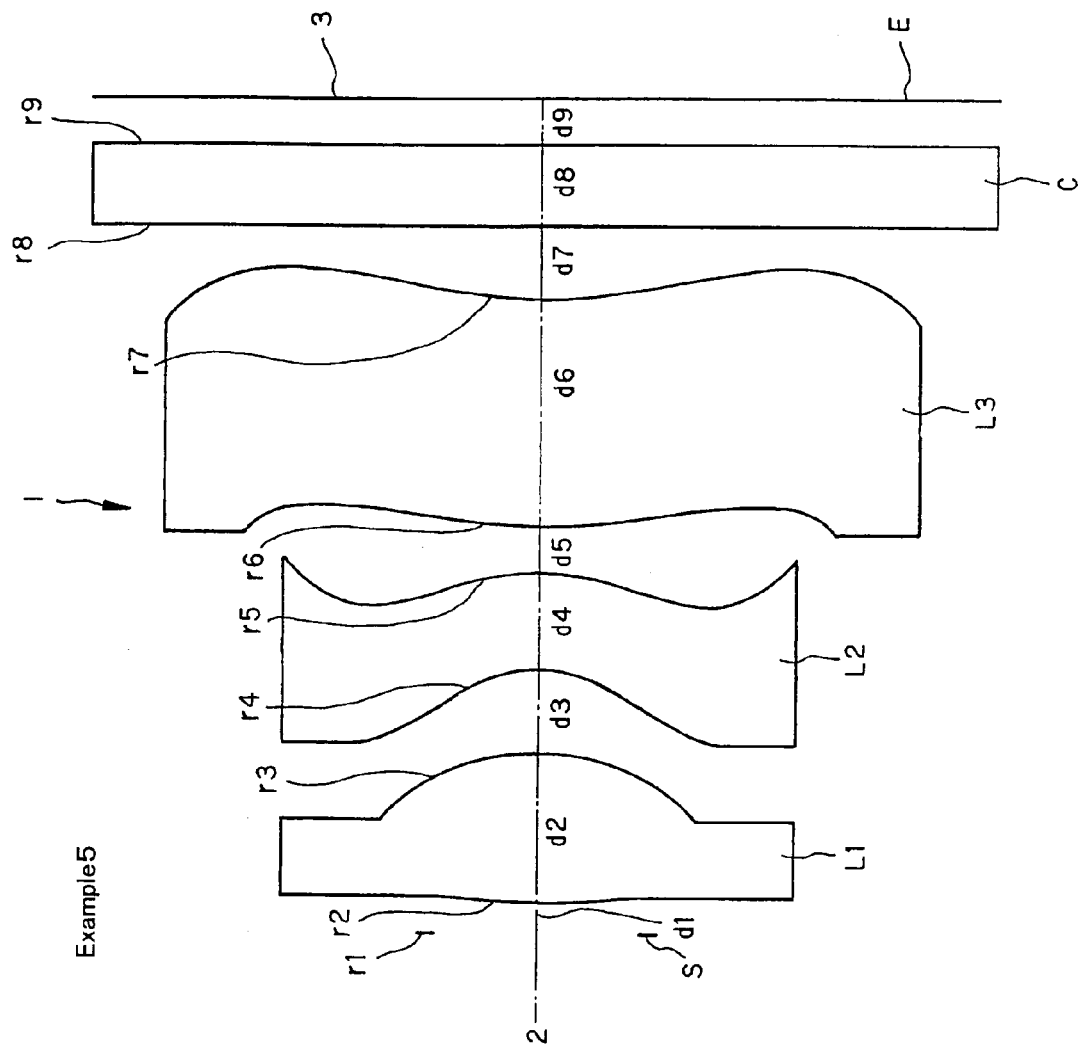
FIG. 5 is illustrative in section of Example 5 of the inventive imaging optical system.

FIG. 5 is illustrative of the lens arrangement of Example 5 of the inventive imaging optical system.

As shown in FIG. 5, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 6:
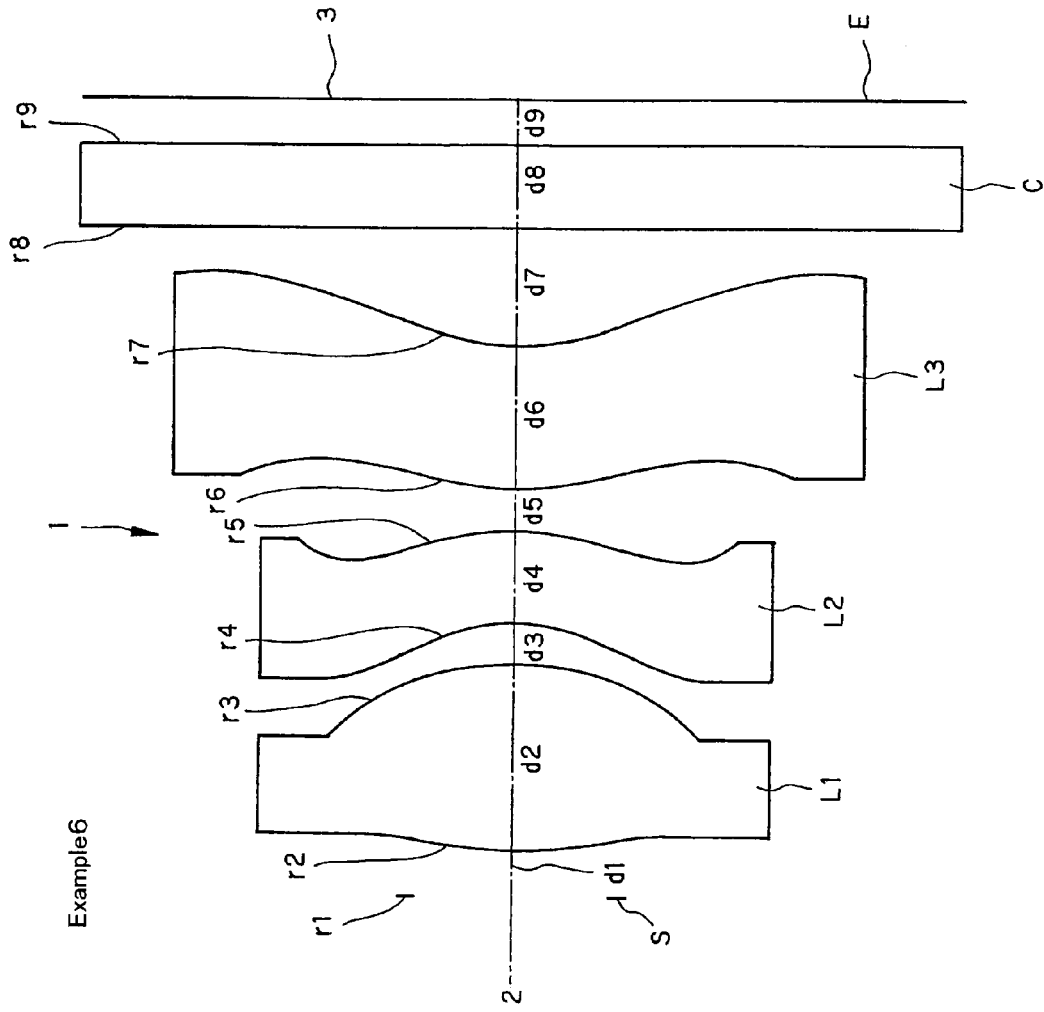
FIG. 6 is illustrative in section of Example 6 of the inventive imaging optical system.

FIG. 6 is illustrative of the lens arrangement of Example 6 of the inventive imaging optical system.

As shown in FIG. 6, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Figure 7:
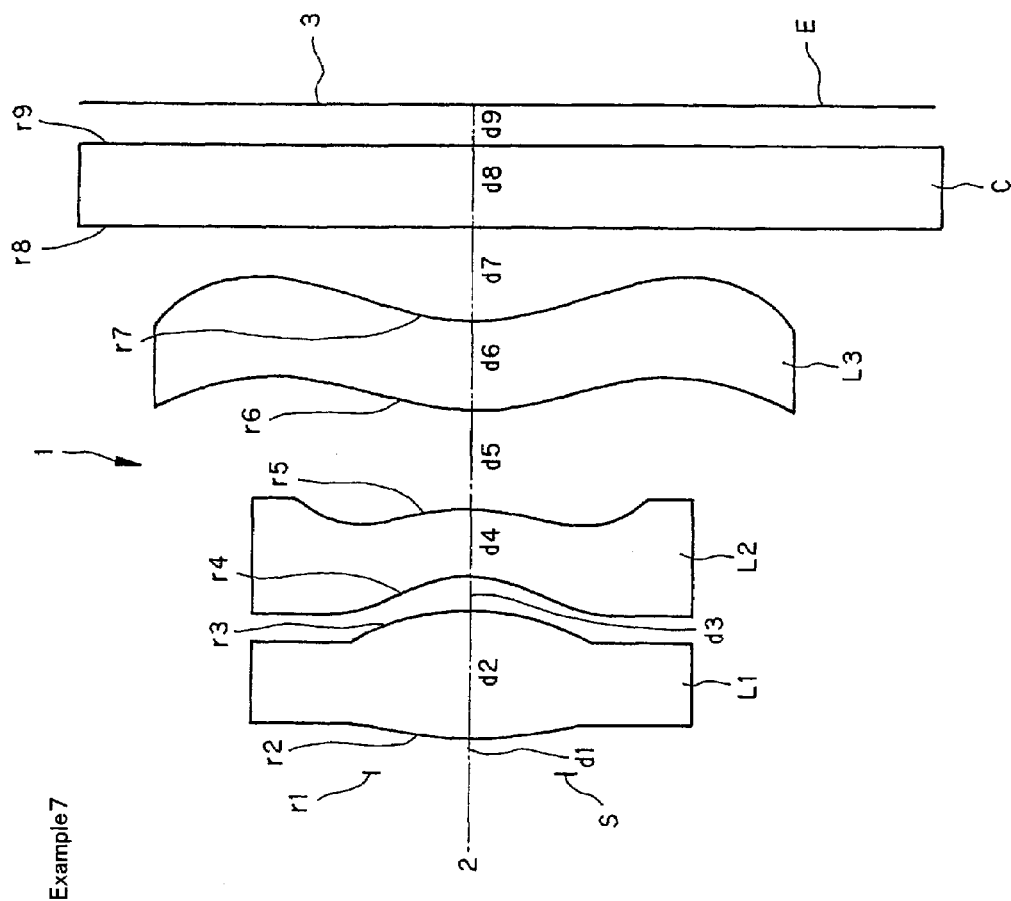
FIG. 7 is illustrative in section of Example 7 of the inventive imaging optical system.
Figure 8:
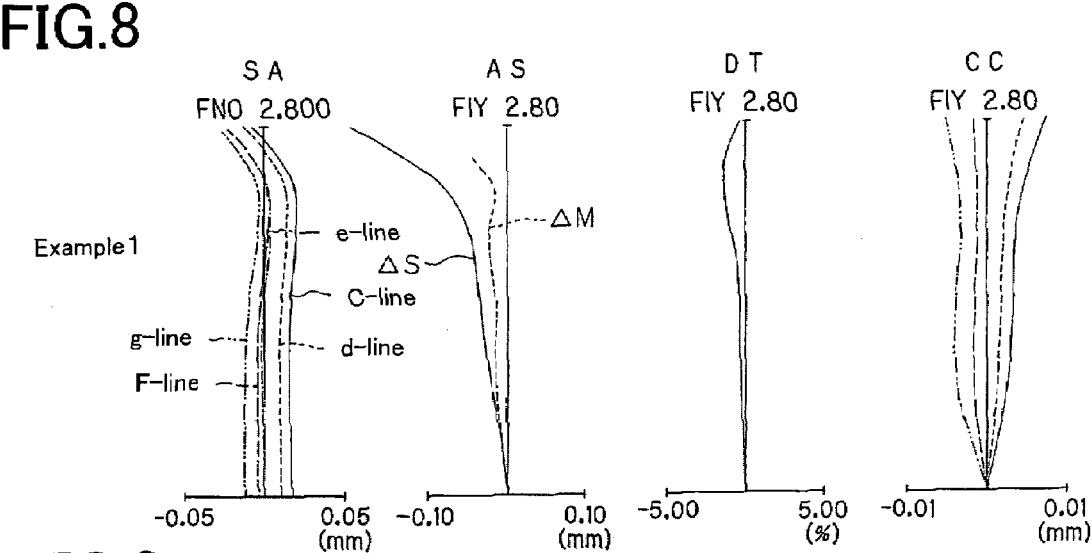
FIG. 8 is an aberration diagram for Example 1.
Figure 9:
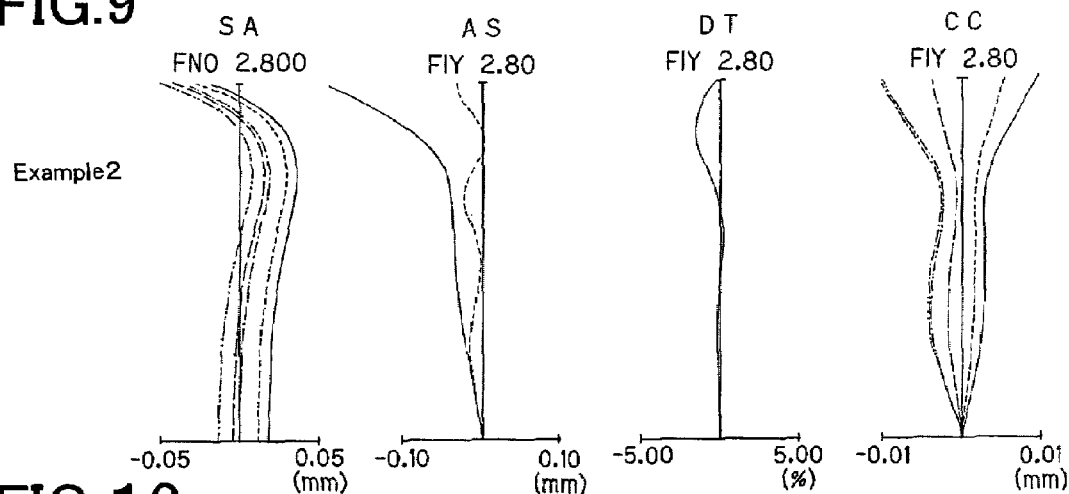
FIG. 9 is an aberration diagram for Example 2.
Figure 10:
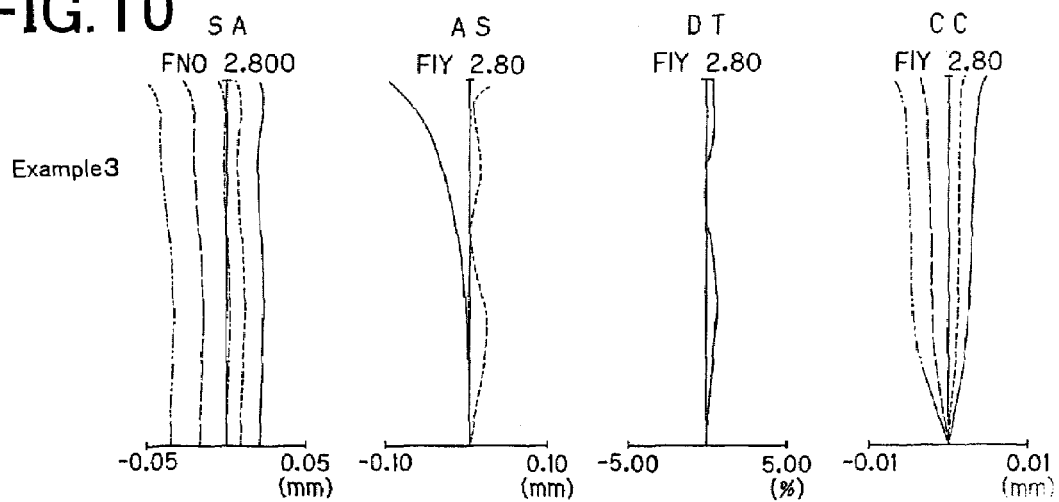
FIG. 10 is an aberration diagram for Example 3.
Figure 11:
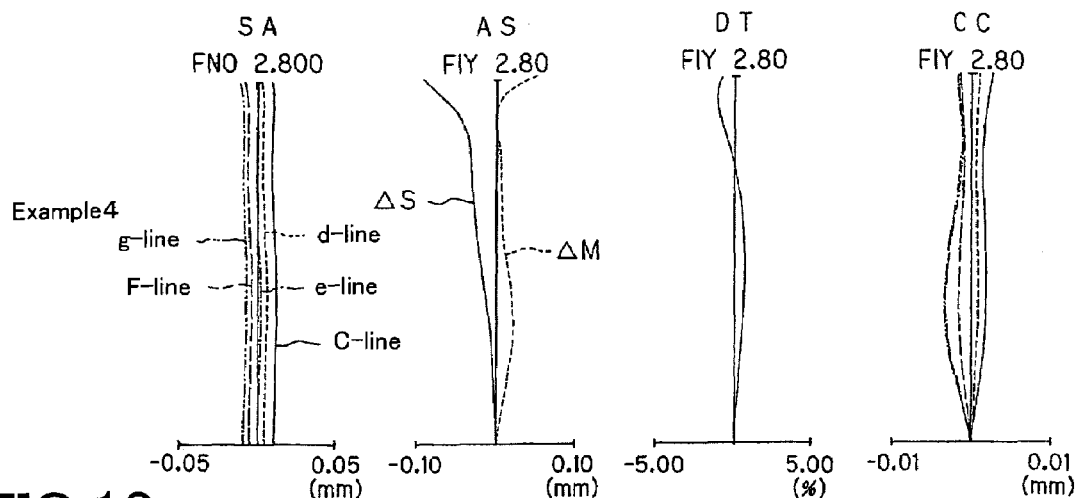
FIG. 11 is an aberration diagram for Example 4.
Figure 12:
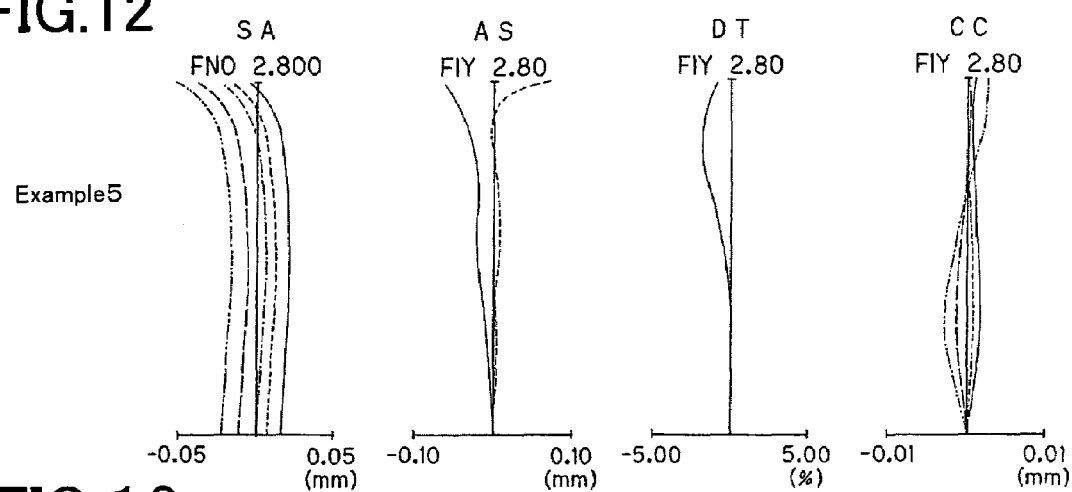
FIG. 12 is an aberration diagram for Example 5.
Figure 13:
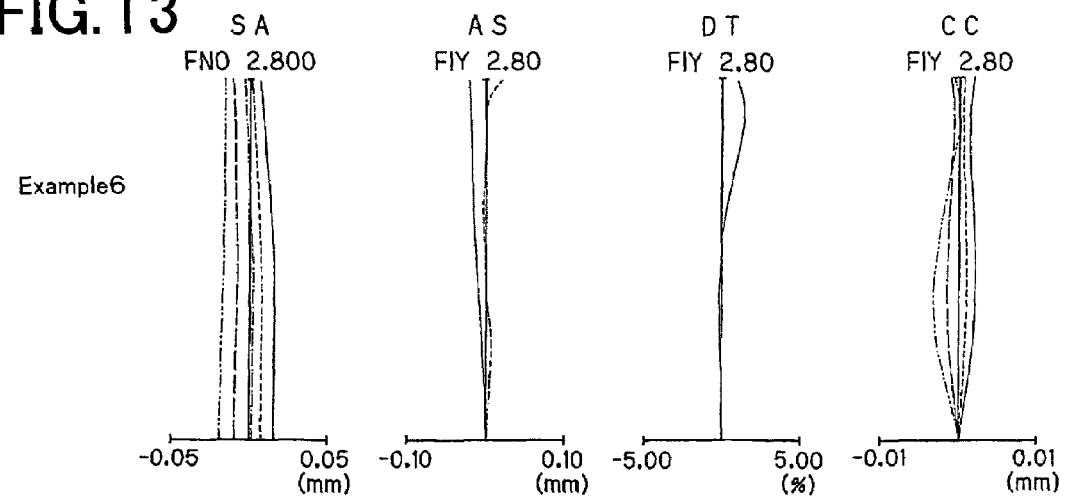
FIG. 13 is an aberration diagram for Example 6.
Figure 14:
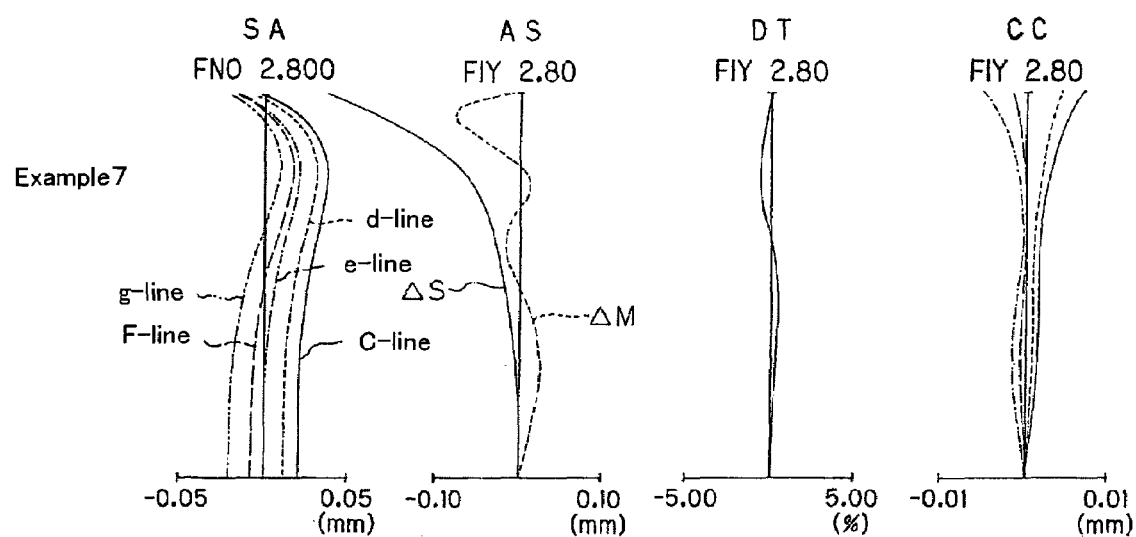
FIG. 14 is an aberration diagram for Example 7.

FIG. 7 is illustrative of the lens arrangement of Example 7 of the inventive imaging optical system.

As shown in FIG. 7, the wide-angle optical system 1 is made up of, in order from its object side, the aperture stop S, the first lens L1 composed of a double-convex positive lens, the second lens L2 composed of a negative meniscus lens convex on its image plane side, the third lens L3 composed of a negative meniscus lens convex on its object side, and the cover glass C.

The first lens L1, the second lens L2, and the third lens L3 has aspheric surfaces used at both its surfaces. The aspheric surfaces of the third lens L3 in particular are each configured in such a way as to allow the peripheral portion to have a weak negative or positive refracting power, and to satisfy condition (1) as well.

Set out below are the numerical data in Examples 1 to 7 together with the values of the respective conditions.

Referring to the numerical data in the above examples and the values of the respective conditions, r is the radius of curvature of each lens surface, d is the lens surface-to-lens surface spacing, n is the d-line refractive index of each lens, and v is the Abbe constant of each lens. Note here that the aspheric configuration involved is given by the following formula with the proviso that x is an optical axis with the direction of travel of light taken as positive, and y is a direction orthogonal to the optical axis.

$$x=(y^2/r)[1+\{1-(K+1)(y/r)^2\}^{1/2}]+A4y^4+A6y^6+A8y^8+A10y^{10}$$

where r is the paraxial radius of curvature, K is the conic constant, and A4, A6, A8 and A10 are the $4^{th}$-, $6^{th}$-, $8^{th}$- and $10^{th}$-order aspheric coefficients.

E±N (where N is an integer) in the numerical data stands for $\times 10^{\pm N}$.

NUMERICAL EXAMPLE 1

Unit mm

Surface Data

| Surface Number | r | d | nd | vd | Effective Diameter |
|---|---|---|---|---|---|
| 1 (Stop) | ∞ | 0.20 | | | 0.63 |
| 2 (Aspheric Surface) | 2.540 | 1.06 | 1.52559 | 56.45 | 0.88 |
| 3 (Aspheric Surface) | −1.141 | 0.19 | | | 1.07 |
| 4 (Aspheric Surface) | −0.676 | 1.07 | 1.58393 | 30.21 | 1.12 |
| 5 (Aspheric Surface) | −1.454 | 0.67 | | | 1.36 |
| 6 (Aspheric Surface) | 1.721 | 0.57 | 1.52559 | 56.45 | 2.18 |
| 7 (Aspheric Surface) | 1.300 | 0.83 | | | 2.43 |
| 8 | ∞ | 0.50 | 1.51633 | 64.14 | 2.62 |
| 9 | ∞ | 0.30 | | | 2.73 |
| Image Plane | ∞ | | | | |

Aspheric Coefficient

2nd Surface

K = −3.173, A4 = −1.53303E−02, A6 = −5.57102E−02
3rd Surface

K = −1.134, A4 = −4.60752E−02, A6 = 4.54402E−02
4th Surface

K = −0.774, A4 = 3.24894E−01, A6 = 7.49671E−02

-continued

Unit mm

5th Surface

K = −0.296, A4 = 1.29553E−01, A6 = 2.03973E−02
6th Surface

K = −2.275, A4 = −3.77809E−02, A6 = 1.95062E−03
7th Surface

K = −3.294, A4 = −2.18975E−02, A6 = −4.93279E−04

Various Data

| Focal Length | 3.55 |
|---|---|
| F-number | 2.8 |
| Angle of View | −38.4° |
| Image Height | 2.8 |
| Total Lens Length | 5.2 |
| BF | 1.48 |

NUMERICAL EXAMPLE 2

Unit mm

Surface Data

| Surface Number | r | d | nd | vd | Effective Diameter |
|---|---|---|---|---|---|
| 1 (Stop) | ∞ | 0.20 | | | 0.65 |
| 2 (Aspheric Surface) | 2.528 | 1.18 | 1.52559 | 56.45 | 0.90 |
| 3 (Aspheric Surface) | −1.254 | 0.20 | | | 1.09 |
| 4 (Aspheric Surface) | −0.739 | 1.02 | 1.58393 | 30.21 | 1.98 |
| 5 (Aspheric Surface) | −1.691 | 0.63 | | | 1.39 |
| 6 (Aspheric Surface) | 1.612 | 0.61 | 1.58393 | 30.21 | 2.06 |
| 7 (Aspheric Surface) | 1.351 | 0.86 | | | 2.36 |
| 8 | ∞ | 0.50 | 1.51633 | 64.14 | 2.60 |
| 9 | ∞ | 0.30 | | | 2.71 |
| Image Plane | ∞ | | | | |

Aspheric Coefficient

2nd Surface

K = −5.621, A4 = 1.40251E−02, A6 = −5.20761E−02
3rd Surface

K = −0.965, A4 = −4.01327E−02
4th Surface

K = −0.739, A4 = 1.76074E−01, A6 = 1.51755E−02
5th Surface

K = 0.067, A4 = 9.18177E−02, A6 = 2.68669E−02
6th Surface

K = −2.207, A4 = −4.43963E−02, A6 = 1.25664E−03
7th Surface

K = −2.929, A4 = −2.72328E−02, A6 = −7.55043E−04

Various Data

| Focal Length | 3.64 |
|---|---|
| F-number | 2.8 |
| Angle of View | −37.6° |
| Image Height | 2.8 |
| Total Lens Length | 5.3 |
| BF | 1.49 |

NUMERICAL EXAMPLE 3

Unit mm

Surface Data

| Surface Number | r | d | nd | vd | Effective Diameter |
|---|---|---|---|---|---|
| 1 (Stop) | ∞ | 0.20 | | | 0.67 |
| 2 (Aspheric Surface) | 3.315 | 1.15 | 1.53071 | 55.69 | 0.86 |
| 3 (Aspheric Surface) | −1.512 | 0.42 | | | 1.12 |
| 4 (Aspheric Surface) | −0.760 | 0.88 | 1.58393 | 30.21 | 1.15 |
| 5 (Aspheric Surface) | −1.466 | 0.50 | | | 1.38 |
| 6 (Aspheric Surface) | 2.626 | 1.11 | 1.53071 | 55.69 | 1.94 |
| 7 (Aspheric Surface) | 2.216 | 0.79 | | | 2.43 |
| 8 | ∞ | 0.30 | 1.51633 | 64.14 | 2.64 |
| 9 | ∞ | 0.30 | | | 2.70 |
| Image Plane | ∞ | | | | |

Aspheric Coefficient

2nd Surface $K = -1.840, A4 = -4.59100E-02, A6 = -3.05100E-02, A8 = -7.12400E-02$ 3rd Surface $K = -1.218, A4 = -7.36900E-02, A6 = -2.97600E-02, A8 = 3.09400E-02, A10 = -2.59300E-02$ 4th Surface $K = -0.926, A4 = 1.49100E-01, A6 = 1.07400E-01, A8 = -8.17500E-02, A10 = 2.31100E-02$ 5th Surface $K = -0.490, A4 = 7.28800E-02, A6 = 5.67100E-02, A8 = -1.36400E-02, A10 = 8.56100E-04$ 6th Surface $K = -7.093, A4 = -2.29700E-02, A6 = -6.43000E-04, A8 = 1.18900E-03, A10 = -2.30700E-04$ 7th Surface $K = -1.369, A4 = -6.13500E-02, A6 = 9.18900E-03, A8 = -7.47900E-04, A10 = -2.48600E-06$

Various Data

| | |
|---|---|
| Focal Length | 3.73 |
| F-number | 2.8 |
| Angle of View | −36.8° |
| Image Height | 2.8 |
| Total Lens Length | 5.5 |
| BF | 1.28 |

NUMERICAL EXAMPLE 4

Unit mm

Surface Data

| Surface Number | r | d | nd | vd | Effective Diameter |
|---|---|---|---|---|---|
| 1 (Stop) | ∞ | 0.10 | | | 0.68 |
| 2 (Aspheric Surface) | 3.076 | 1.11 | 1.53071 | 55.69 | 0.80 |
| 3 (Aspheric Surface) | −1.651 | 0.42 | | | 1.05 |
| 4 (Aspheric Surface) | −0.838 | 0.80 | 1.63259 | 23.27 | 1.10 |
| 5 (Aspheric Surface) | −1.568 | 0.40 | | | 1.30 |
| 6 (Aspheric Surface) | 3.271 | 1.39 | 1.53071 | 55.69 | 1.67 |
| 7 (Aspheric Surface) | 2.771 | 0.74 | | | 2.38 |
| 8 | ∞ | 0.30 | 1.51633 | 64.14 | 2.66 |
| 9 | ∞ | 0.30 | | | 2.72 |
| Image Plane | ∞ | | | | |

Aspheric Coefficient

2nd Surface $K = -1.561, A4 = -4.45188E-02, A6 = -2.78685E-02, A8 = -4.80497E-02$ 3rd Surface $K = -1.110, A4 = -7.35754E-02, A6 = -2.18139E-03, A8 = 8.64574E-03, A10 = -1.50468E-02$ 4th Surface $K = -0.906, A4 = 1.40870E-01, A6 = 1.10717E-01, A8 = -7.36659E-02, A10 = 1.76769E-02$ 5th Surface $K = -0.424, A4 = 6.85954E-02, A6 = 5.20628E-02, A8 = -1.17039E-02, A10 = 1.12392E-03$ 6th Surface $K = -15.009, A4 = -1.96223E-02, A6 = -7.60260E-03, A8 = 3.02406E-03, A10 = -7.56075E-04$ 7th Surface $K = -2.040, A4 = -4.50247E-02, A6 = 6.82918E-03, A8 = -1.05009E-03, A10 = 3.98509E-05$

Various Data

| | |
|---|---|
| Focal Length | 3.77 |
| F-number | 2.8 |
| Angle of View | −36.8° |
| Image Height | 2.8 |
| Total Lens Length | 5.5 |
| BF | 1.23 |

NUMERICAL EXAMPLE 5

Unit mm

Surface Data

| Surface Number | r | d | nd | vd | Effective Diameter |
|---|---|---|---|---|---|
| 1 (Stop) | ∞ | 0.20 | | | 0.67 |
| 2 (Aspheric Surface) | 3.324 | 1.01 | 1.53071 | 55.69 | 0.85 |
| 3 (Aspheric Surface) | −1.674 | 0.54 | | | 1.08 |
| 4 (Aspheric Surface) | −0.757 | 0.66 | 1.63493 | 23.90 | 1.18 |
| 5 (Aspheric Surface) | −1.327 | 0.30 | | | 1.30 |
| 6 (Aspheric Surface) | 3.358 | 1.50 | 1.53071 | 55.69 | 1.71 |
| 7 (Aspheric Surface) | 2.819 | 0.49 | | | 2.41 |
| 8 | ∞ | 0.55 | 1.51633 | 64.14 | 2.59 |
| 9 | ∞ | 0.30 | | | 2.69 |
| Image Plane | ∞ | | | | |

Aspheric Coefficient

2nd Surface $K = -5.092, A4 = -5.50591E-02, A6 = -5.09238E-02, A8 = -7.58536E-02$ 3rd Surface $K = -0.576, A4 = -8.24414E-02, A6 = -4.45512E-02, A8 = 5.35929E-02, A10 = -3.84535E-02$ 4th Surface $K = -1.012, A4 = 1.68277E-01, A6 = 1.10237E-01, A8 = -6.94271E-02, A10 = 1.40257E-02$ -continued Unit mm 5th Surface

K = −0.990, A4 = 1.04031E−01, A6 = 5.26561E−02,
A8 = −1.30418E−02

6th Surface

K = −17.986, A4 = 1.55583E−02, A6 = −3.08028E−02,
A8 = 1.16072E−02, A10 = −1.74421E−03

7th Surface

K = −11.416, A4 = 1.13495E−03, A6 = −9.12222E−03,
A8 = 1.80868E−03, A10 = −1.45708E−04

Various Data

| Focal Length | 3.71 |
|---|---|
| F-number | 2.8 |
| Angle of View | −37.3° |
| Image Height | 2.8 |
| Total Lens Length | 5.3 |
| BF | 1.15 |

NUMERICAL EXAMPLE 6

Unit mm

Surface Data

| Surface Number | r | d | nd | vd | Effective Diameter |
|---|---|---|---|---|---|
| 1 (Stop) | ∞ | 0.30 | | | 0.64 |
| 2 (Aspheric Surface) | 2.745 | 1.25 | 1.53071 | 55.69 | 0.96 |
| 3 (Aspheric Surface) | −2.086 | 0.28 | | | 1.23 |
| 4 (Aspheric Surface) | −0.972 | 0.62 | 1.63493 | 23.90 | 1.28 |
| 5 (Aspheric Surface) | −1.600 | 0.29 | | | 1.32 |
| 6 (Aspheric Surface) | 1.711 | 0.96 | 1.53071 | 55.69 | 1.63 |
| 7 (Aspheric Surface) | 1.307 | 0.80 | | | 2.19 |
| 8 | ∞ | 0.55 | 1.51633 | 64.14 | 2.38 |
| 9 | ∞ | 0.30 | | | 2.59 |
| Image Plane | ∞ | | | | |

Aspheric Coefficient

2nd Surface

K = −5.000, A4 = −3.65347E−03, A6 = −2.48862E−02,
A8 = −2.20502E−02

3rd Surface

K = −5.000, A4 = −9.48178E−02, A6 = −4.58479E−03

4th Surface

K = −2.831, A4 = 2.18773E−02, A6 = 2.63702E−02

5th Surface

K = −0.910, A4 = 1.05916E−01, A6 = 1.59999E−02,
A8 = 6.98342E−04

6th Surface

K = −5.000, A4 = −5.52400E−02, A6 = 3.02948E−03

7th Surface

K = −3.786, A4 = −3.16572E−02, A6 = 4.68703E−03,
A8 = −4.22895E−04

Various Data

| Focal Length | 3.59 |
|---|---|
| F-number | 2.8 |
| Angle of View | −37.7° |

-continued

Unit mm

| Image Height | 2.8 |
|---|---|
| Total Lens Length | 5.1 |
| BF | 1.47 |

NUMERICAL EXAMPLE 7

Unit mm

Surface Data

| Surface Number | r | d | nd | vd | Effective Diameter |
|---|---|---|---|---|---|
| 1 (Stop) | ∞ | 0.24 | | | 0.62 |
| 2 (Aspheric Surface) | 2.323 | 0.94 | 1.52559 | 56.45 | 0.92 |
| 3 (Aspheric Surface) | −1.684 | 0.25 | | | 1.09 |
| 4 (Aspheric Surface) | −0.771 | 0.48 | 1.58393 | 30.21 | 1.19 |
| 5 (Aspheric Surface) | −1.418 | 0.71 | | | 1.18 |
| 6 (Aspheric Surface) | 1.647 | 0.65 | 1.52559 | 56.45 | 1.93 |
| 7 (Aspheric Surface) | 1.420 | 0.50 | | | 2.25 |
| 8 | ∞ | 0.50 | 1.51633 | 64.14 | 2.47 |
| 9 | ∞ | 0.54 | | | 2.61 |
| Image Plane | ∞ | | | | |

Aspheric Coefficient

2nd Surface

K = 1.373, A4 = −6.48922E−02, A6 = −7.14622E−02,
A8 = −3.64287E−02, A10 = 6.17409E−02

3rd Surface

K = 0.000, A4 = −4.68358E−02, A6 = 2.92909E−02,
A8 = 2.90073E−02, A10 = −8.75951E−03

4th Surface

K = −1.002, A4 = 4.06561E−01, A6 = −1.21298E−02,
A8 = −2.79473E−02, A10 = 3.67448E−03

5th Surface

K = −0.959, A4 = 2.53800E−01, A6 = 6.85022E−02,
A8 = −5.74446E−02, A10 = 1.15390E−02

6th Surface

K = −5.072, A4 = −2.83124E−02, A6 = −1.16295E−02,
A8 = 3.75786E−03, A10 = −3.02246E−04

7th Surface

K = −4.453, A4 = −2.25374E−02, A6 = −7.90523E−03,
A8 = 2.04710E−03, A10 = −1.94628E−04

Various Data

| Focal Length | 3.48 |
|---|---|
| F-number | 2.8 |
| Angle of View | −38.8° |
| Image Height | 2.8 |
| Total Lens Length | 4.6 |
| BF | 1.37 |

| | Example 1 | Example 2 | Example 3 | Example 4 |
|---|---|---|---|---|
| Condition (1-1) | −0.187 | −0.035 | −0.008 | −0.004 |
| Condition (1-2) | 0.902 | 0.943 | 0.937 | 0.999 |
| Condition (2) | 0.142 | 0.128 | 0.074 | 0.055 |
| Condition (3) | 30.21 | 30.21 | 30.21 | 23.27 |

-continued

|  | | | | |
|---|---|---|---|---|
| Condition (4) | 1.68 | 1.69 | 1.99 | 1.96 |
| Condition (5) | 0.66 | 0.67 | 0.66 | 0.67 |
| Condition (6) | −1.01 | −0.99 | −0.99 | −0.90 |
| Condition (7) | 0.27 | 0.26 | 0.36 | 0.40 |
| Condition (8) | 32.2 | 31.8 | 39.9 | 36.2 |
| Condition (9) | 0.38 | 0.34 | 0.37 | 0.30 |
| Condition (10-1) | 0.415 | 0.410 | 0.344 | 0.327 |
| Condition (10-2) | −0.807 | −0.986 | −0.747 | −0.765 |
| Condition (10-3) | 0.000 | −0.058 | 0.000 | 0.000 |
| Condition (10-4) | 1.597 | 1.619 | 1.760 | 2.000 |

|  | Example 5 | Example 6 | Example 7 |
|---|---|---|---|
| Condition (1-1) | −0.004 | −0.061 | −0.002 |
| Condition (1-2) | 1.059 | 0.711 | 0.995 |
| Condition (2) | 0.057 | 0.140 | 0.078 |
| Condition (3) | 23.9 | 23.9 | 30.21 |
| Condition (4) | 2.20 | 2.15 | 2.18 |
| Condition (5) | 0.68 | 0.69 | 0.74 |
| Condition (6) | −0.88 | −0.83 | −0.70 |
| Condition (7) | 0.39 | 0.33 | 0.30 |
| Condition (8) | 35.3 | 42.7 | 34.3 |
| Condition (9) | 0.33 | 0.13 | 0.16 |
| Condition (10-1) | 0.310 | 0.408 | 0.395 |
| Condition (10-2) | −0.741 | −0.573 | −0.880 |
| Condition (10-3) | 0.000 | 0.000 | 0.000 |
| Condition (10-4) | 2.200 | 2.138 | 0.676 |

Aberration diagrams for Examples 1 to 7 are presented in the form of FIGS. 8 to 14 wherein the acronyms SA, AS and DT stand for spherical aberrations, astigmatism and distortion, respectively, and the acronyms FNO and FIY represent an F-number and an image height, respectively.

What is claimed is:

1. A wide-angle optical system, characterized by comprising, in order from its object side, a stop, a first lens having positive refracting power, a second lens having negative refracting power and a third lens that is an aspheric lens, wherein said third lens is configured such that as viewed in a lens section including an optical axis, a portion thereof near said optical axis is in a meniscus shape convex on an object side thereof, and an object side surface and an image side surface thereof at a peripheral site are in a meniscus shape convex on an image side thereof, with satisfaction of the following conditions (1-1) and (1-2)

$$-0.40 < f/f3 < 0.15 \quad (1\text{-}2)$$

$$0.30 < hc7/hp7 < 2.0 \quad (1\text{-}2)$$

where f is a focal length of the whole wide-angle optical system, and f3 is a focal length of said third lens, and when Lm stands for a light ray passing through the center of said stop at an angle of 36° with said optical axis, and Pm7 stands for a point at which Lm passes the image side surface of the third lens, hc7 is a distance from Pm7 to said optical axis, and hp7 is a distance from a convex apex Pp7 of the image side surface of said third lens to said optical axis.

2. The wide-angle optical system according to claim 1, characterized by satisfying the following condition (2)

$$0.06 < dp7/f < 0.3 \quad (2),$$

where dp7 is an optical axis direction length from a point of intersection Pc7 of the image side surface of said third lens with said optical axis to said apex Pp7.

3. The wide-angle optical system according to claim 1, characterized in that said second lens satisfies the following condition (3)

$$v2 < 25 \quad (3),$$

where v2 is an Abbe constant of said second lens.

4. The wide-angle optical system according to claim 1, characterized in that said first lens and said second lens satisfy the following condition (4)

$$0.9 < R2/R3 < 4.4 \quad (4),$$

where R2 is a radius of curvature of the image side surface of said first lens, and R3 is a radius of curvature of the object side surface of said second lens.

5. The wide-angle optical system according to claim 1, characterized by satisfying the following condition (5)

$$0.3 < |Hr/\Sigma d| < 1.4 \quad (5),$$

where Hr is a distance from an imaging plane to a rear principal point position, and $\Sigma d$ is a total length of said wide-angle optical system.

6. The wide-angle optical system according to claim 1, characterized by satisfying the following condition (6)

$$-2.0 < Exp/f < -0.45 \quad (6),$$

where f is a focal length of said whole wide-angle optical system, and

Exp is a distance from an image plane position to an exit pupil position.

7. The wide-angle optical system according to claim 1, characterized by satisfying the following condition (7)

$$0.1 \text{ (mm)} < L3d/Fnos < 0.7 \text{ (mm)} \quad (7),$$

where L3d is a distance from the object side surface of said third lens to an imaging position, and Fnos is a minimum F-number.

8. The wide-angle optical system according to claim 1, characterized by satisfying the following condition (8)

$$25\% < ILL < 45\% \quad (8),$$

where ILL is a proportion of a light quantity at the periphery relative to a light quantity at the center.

9. The wide-angle optical system according to claim 1, characterized by satisfying the following condition (9)

$$0.07 < (R1+R2)/(R1-R2) < 0.8 \quad (9),$$

where R1 is a radius of curvature of the object side surface of said first lens, and R2 is a radius of curvature of the image side surface of said first lens.

10. The wide-angle optical system according to claim 1, characterized by satisfying the following conditions (10-1) to (10-4).

$$0.39 < fb/f < 0.85 \quad (10\text{-}1)$$

$$-1.2 < f2/f < -0.3 \quad (10\text{-}2)$$

$$-0.18 < (n1-n3) < 0.08 \quad (10\text{-}3)$$

$$1.3 < d4/d5 < 9 \quad (10\text{-}4)$$

where fb is a back focus position of said wide-angle optical system, f2 is a focal length of said second lens, n1 and n2 are refractive indices of said first lens and said second lens, respectively, d4 is a thickness of said second lens, and d5 is an air spacing between said second lens and said third lens.

11. An imaging apparatus, characterized by comprising a wide-angle optical system as recited in claim 1, and an imaging device that is located on an image side of said wide-angle optical system and converts an optical image into electric signals.

* * * * *